(12) United States Patent
Gamage et al.

(10) Patent No.: US 9,010,200 B2
(45) Date of Patent: Apr. 21, 2015

(54) DEVICE FOR MEASURING FORCES AND METHOD OF MAKING THE SAME

(75) Inventors: Sisira Kankanam Gamage, Palo Alto, CA (US); Naresh Venkata Mantravadi, San Jose, CA (US); Calin Victor Miclaus, Fremont, CA (US)

(73) Assignee: Amphenol Thermometrics, Inc., St. Mary's, PA (US)

( * ) Notice: Subject to any disclaimer, the term of this patent is extended or adjusted under 35 U.S.C. 154(b) by 244 days.

(21) Appl. No.: 13/567,723

(22) Filed: Aug. 6, 2012

(65) Prior Publication Data

US 2014/0033833 A1 Feb. 6, 2014

(51) Int. Cl.
*G01L 1/04* (2006.01)
*G01L 9/00* (2006.01)

(52) U.S. Cl.
CPC .................................. *G01L 9/0047* (2013.01)

(58) Field of Classification Search
USPC ...................... 73/760, 777, 862.625–862.627
See application file for complete search history.

(56) References Cited

U.S. PATENT DOCUMENTS

| | | | |
|---|---|---|---|
| 4,274,423 A | 6/1981 | Mizuno et al. | |
| 4,525,766 A | 6/1985 | Petersen | |
| 4,785,822 A | 11/1988 | Wallace | |
| 5,002,901 A * | 3/1991 | Kurtz et al. | 438/51 |
| 5,013,396 A | 5/1991 | Wise et al. | |
| 5,068,203 A | 11/1991 | Logsdon et al. | |
| 5,395,802 A | 3/1995 | Kiyota et al. | |
| 5,576,250 A | 11/1996 | Diem et al. | |
| 5,747,353 A | 5/1998 | Bashir et al. | |
| 5,996,411 A | 12/1999 | Leonardson et al. | |
| 6,038,928 A | 3/2000 | Maluf et al. | |
| 6,104,073 A | 8/2000 | Ferrari et al. | |
| 6,338,284 B1 | 1/2002 | Najafi et al. | |
| 6,912,759 B2 | 7/2005 | Izadnegahdar et al. | |
| 6,959,608 B2 | 11/2005 | Bly et al. | |
| 7,223,624 B2 | 5/2007 | Wu et al. | |
| 7,284,441 B2 | 10/2007 | Zdeblick | |
| 7,327,003 B2 | 2/2008 | Martin et al. | |
| 7,440,645 B2 * | 10/2008 | Kurtz et al. | 385/13 |
| 7,478,559 B2 | 1/2009 | Tan et al. | |
| 7,622,782 B2 | 11/2009 | Chu et al. | |
| 7,997,142 B2 * | 8/2011 | Chiou et al. | 73/715 |
| 7,998,777 B1 | 8/2011 | Gamage et al. | |
| 8,485,041 B2 * | 7/2013 | Ahles et al. | 73/715 |
| 8,590,389 B2 * | 11/2013 | Hsu et al. | 73/754 |
| 2001/0001550 A1 * | 5/2001 | Bryzek et al. | 338/36 |

(Continued)

FOREIGN PATENT DOCUMENTS

| | | | |
|---|---|---|---|
| EP | 0302654 A2 | 2/1989 | |
| EP | 0336437 A2 | 10/1989 | |

(Continued)

OTHER PUBLICATIONS

Lee A. Christel, Kurt Petersen, Lucas NovaSensor, A Catheter Pressure Sensor With Side Vent Using Multiple Silicon Fusion Bonding, Dec. 30, 2022, 4 pages.

*Primary Examiner* — Max Noori
(74) *Attorney, Agent, or Firm* — Blank Rome LLP

(57) ABSTRACT

A device for measuring forces and a method of making the same. The device has a boss structure within a diaphragm cavity, wherein the boss structure has substantially parallel sidewalls. One or more sensors are installed proximate to the diaphragm to sense flexure in the diaphragm, which is controlled by the boss structure.

13 Claims, 10 Drawing Sheets

(56) References Cited

U.S. PATENT DOCUMENTS

| | | |
|---|---|---|
| 2004/0065638 A1 | 4/2004 | Gogoi |
| 2005/0001316 A1 | 1/2005 | Dean et al. |
| 2005/0145938 A1* | 7/2005 | Lin .............................. 257/347 |
| 2006/0272414 A1 | 12/2006 | Ayazi et al. |
| 2011/0159627 A1 | 6/2011 | Mantravadi et al. |
| 2011/0259109 A1* | 10/2011 | Ahles et al. ..................... 73/727 |
| 2011/0308324 A1 | 12/2011 | Gamage et al. |
| 2011/0309458 A1 | 12/2011 | Gamage et al. |

FOREIGN PATENT DOCUMENTS

| | | |
|---|---|---|
| EP | 1561724 A1 | 8/2005 |
| EP | 2339357 A1 | 6/2011 |
| WO | WO-2007117198 | 10/2007 |

* cited by examiner

DEVICE FOR MEASURING FORCES AND METHOD OF MAKING THE SAME

BACKGROUND OF THE INVENTION

The subject matter disclosed herein relates to semiconductor microelectromechanical based sensors (MEMS) that are used to detect small forces or flexures generated from mechanical stress, chemo-mechanical stress, thermal stress, electromagnetic fields, and the like. More particularly, the subject matter disclosed herein relates to a device for sensing pressure and a method of manufacturing the same.

Advances in semiconductor microelectronic based sensors have greatly reduced the size and cost of such sensors. The electrical and mechanical properties of silicon microsensors, as well as silicon micromachining and semiconductor microelectronic technologies, have improved. For example, micromachined silicon pressure sensors, acceleration sensors, flow sensors, humidity sensors, microphones, mechanical oscillators, optical and RF switches and attenuators, microvalves, ink jet print heads, atomic force microscopy tips and the like are used in various applications in medical, aerospace, industrial and automotive markets. The high yield strength, elasticity at room temperature, and hardness properties of silicon make it an ideal base material for resonant structures that are, for example, useful for sensor structures. Even consumer items such as watches, scuba diving equipment, hand-held tire pressure gauges and sleep apnea machines incorporate silicon micromachined sensors.

The demand for silicon sensors in ever expanding fields of use continues to fuel a need for new and different silicon microsensor geometries and configurations optimized for particular environments and applications. The expanding fields of use for microelectromechanical devices in general, and sensors used to measure forces such as pressure in particular, have created a demand for ever smaller devices. Unfortunately, there has been difficulty producing smaller devices that are also highly sensitive to small changes in pressure. Because of the small size of the devices and the thin nature of the geometries used, it is difficult for conventional techniques to maintain the stringent tolerances required, especially during high volume manufacturing. Additionally, limitations in the depth to which structures may be diffused or implanted within such MEMS devices during manufacturing limit the design and operational characteristics of such devices.

It would be advantageous to provide a method for manufacturing highly sensitive pressure sensors that are not only small in size, but which can be effectively produced in high volume. The discussion above is merely provided for general background information and is not intended to be used as an aid in determining the scope of the claimed subject matter.

BRIEF DESCRIPTION OF THE INVENTION

A device for measuring forces and a method of making the same is disclosed. The device comprises a boss structure within a diaphragm cavity, wherein the boss structure has substantially parallel sidewalls and substantially uniform thickness over its width. One or more sensors are installed proximate to the diaphragm to sense flexure in the diaphragm, which is controlled by the boss structure. An advantage that may be realized in the practice of some disclosed embodiments of the sensor is that the shape and dimensions of both the diaphragm and the boss structure of a MEMS based pressure sensor can be precisely controlled even using high volume manufacturing techniques.

In one exemplary embodiment a device for measuring forces is disclosed, the device comprising a first wafer comprising a first buried oxide layer disposed between a first device layer and a second device layer. The device further comprises a second wafer joined to the first device layer by a second buried oxide layer. A diaphragm cavity extends from the second device layer, through the first device layer, the second buried oxide layer, and the second wafer, wherein the second device layer forms a diaphragm over the diaphragm cavity. A boss structure is provided within the diaphragm cavity that extends from the first buried oxide layer. The boss structure has substantially parallel sidewalls. A first sensor in the second device layer is provided to sense flexure in the diaphragm.

In another exemplary embodiment a device for measuring forces is disclosed, the device comprising a first wafer comprising a first buried oxide layer disposed between a first device layer and a second device layer. The device further comprises a second wafer joined to the first device layer by a second buried oxide layer. A diaphragm cavity extends from the second device layer, through the first device layer, the second buried oxide layer, and the second wafer, wherein the second device layer forms a diaphragm over the diaphragm cavity. A boss structure is provided within the diaphragm cavity that extends from the first buried oxide layer. The boss structure has substantially parallel sidewalls. A first sensor in the second device layer is provided to sense flexure in the diaphragm.

In yet another exemplary embodiment, a method of defining a boss structure for use in a device for measuring forces is disclosed, the method comprising the steps of etching first and second channels in a first device layer of a first wafer, the first and second channels being substantially parallel to one another and extending from a top surface of the first wafer to a first buried oxide layer to define the boss structure. A thermal oxide layer is applied on vertical sidewalls of the first and second channels including inner vertical sidewalls adjacent the boss structure defined by the first and second channels. At least two sacrificial fins are etched in the first device layer after the step of applying the thermal oxide layer, the sacrificial fins extending from the top surface to the first buried oxide layer and having edges that are substantially oxide-free, the sacrificial fins being disposed in regions flanking the first and second channels. The sacrificial fins are removed by etching a portion of the first device layer to define a diaphragm and diaphragm cavity. The thermal oxide layer on the inner vertical sidewalls is removed.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
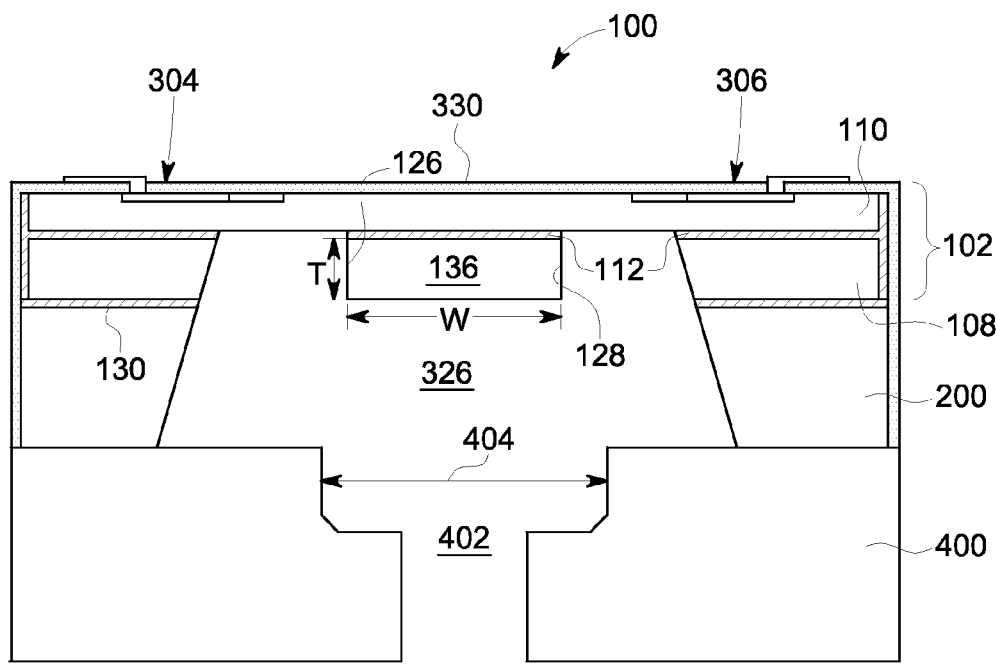
FIG. 1 is a cross sectional view of an exemplary device for measuring forces.

FIG. 1 is a cross sectional view of an exemplary device 100 for measuring forces. A process flow showing the steps of a method 500 of manufacturing the exemplary device 100 for measuring forces is shown in FIG. 18, with various stages of manufacturing shown in FIGS. 2-17.

The device 100 comprises a first wafer 102, a second wafer 200 and a substrate 400 fused together to a form a diaphragm cavity 326. The first wafer 102 comprises a first device layer 108 and second device layer 110 with a first buried oxide layer 112 disposed therebetween. An oxide layer 130 is located between the first device layer 108 of the first wafer 102 and the second wafer 200.

A diaphragm 330 is formed over the diaphragm cavity 326. First and second sensors 304, 306 flank the diaphragm 330. In one embodiment, the device 100 measures pressure by using the first and second sensors 304, 306 to sense the deflection of the diaphragm 330 caused by pressure acting on the diaphragm 330 to deflect the diaphragm 330 towards or away from the diaphragm cavity 326.

A boss structure 136 extends from the first buried oxide layer 112 of the diaphragm 330. By controlling the shape and dimensions, for example, the width, thickness, etc., of the boss structure 136, the sensitivity of the diaphragm 330 can be tuned and the device may be produced in a more repeatable and consistent fashion.

In one embodiment, the boss structure 136 has substantially parallel sidewalls 126, 128 and has substantially uniform thickness (T) over its width (W). This permits the boss structure 136 to have a well defined and controlled shape and dimensions. An advantage that may be realized in the practice of some embodiments of the described device and method of manufacturing is that the shape and dimensions of both the diaphragm and the boss structure of a MEMS based pressure sensor can be precisely controlled using high volume manufacturing techniques.

In differential pressure sensor embodiments, such as the exemplary embodiment of FIG. 1, pressure measurements are made with respect to the pressure acting on the diaphragm 330 in relation to the environmental pressure in which the device 100 is located. The diaphragm cavity 326 can be opened to the surrounding environment by way of a preformed hole 402 in the substrate 400. Substrate 400 may be, for example, a glass or silicon substrate. In absolute pressure sensor embodiments, in which measurements are made in relation to a selected reference pressure, the diaphragm cavity 326 can be isolated by closing or elimination preformed hole 402.

The various structural features of the device 100 may be formed using etching and masking techniques. Suitable etching techniques include dry or wet etching techniques, for example deep reactive-ion etching (DRIE), wet etching with potassium hydroxide (KOH), tetramethylammonium hydroxide (TMAH), or other silicon etchants. Masks may be photoresist masks, silicon dioxide masks, silicon nitride masks, or other suitable masks.

Figure 2:
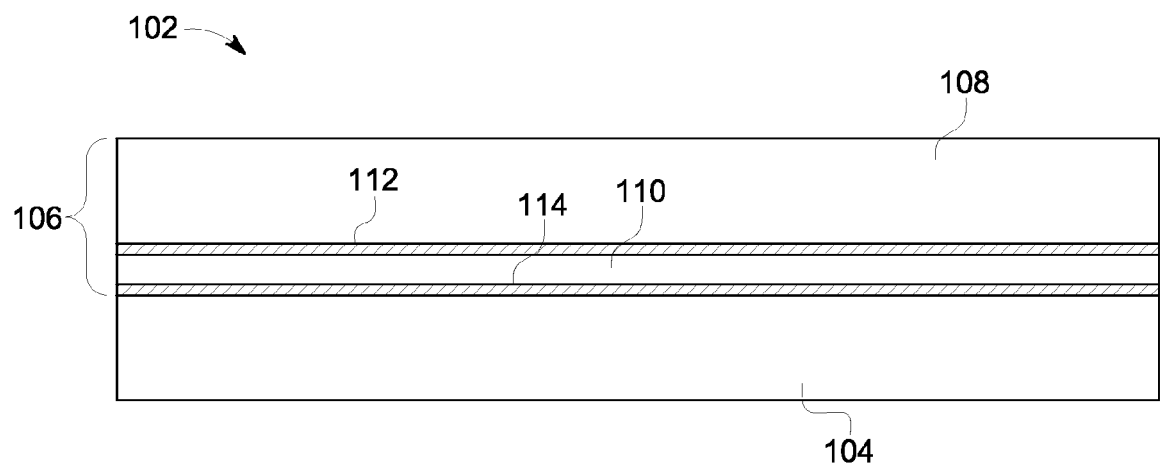
FIG. 2 is a cross sectional view of a first wafer comprising two buried oxide layers.

FIG. 2 is a cross sectional view of the first wafer 102, which comprises a handle layer 104 and a device wafer 106 disposed thereon. The handle layer 104 can be used to grip the first wafer 102 during the manufacturing process. The first wafer 102 comprises a first device layer 108 and a second device layer 110 with a first buried oxide layer 112 disposed therebetween. In one embodiment, the device wafer 106 is a double silicon-on-insulator (DSOI) wafer. A second buried oxide layer 114 is disposed between the handle layer 104 and the second device layer 110. The first buried oxide layer 112 and the second device buried oxide layer 114 may be, for example, silicon dioxide layers. The device layers 108, 110 and the handle layer 104 may be single crystal silicon with various dopant types. For example, the first device layer 108, the second device layer 110 and the handle layer 104 may be formed independently with either n-type or p-type dopants. In one embodiment, the second device layer 110 is n-type while each of the first device layer 108 and the handle layer 104 may be either n-type or p-type. The second device layer 110 may have a resistivity of from about 0.5 ohm-cm to about 1.0 ohm-cm.

As can be seen in FIG. 1, the thicknesses of the various layers can be selected to satisfy the design requirements of device 100. For example, the thickness of first device layer 108 is selected to control the thickness of the boss structure 136. The thickness of the second device layer 110, which will form diaphragm 330, is selected to adjust for the desired pressure range of the resulting device 100. The second device layer 110 is typically between 3 microns and 20 microns thick with a thinner layer providing greater deflection and therefore greater sensitivity. The other components (e.g., 114, 200) are typically sized to provide diaphragm cavity 326 with a thickness of from about 400 microns to about 500 microns.

Figure 3:
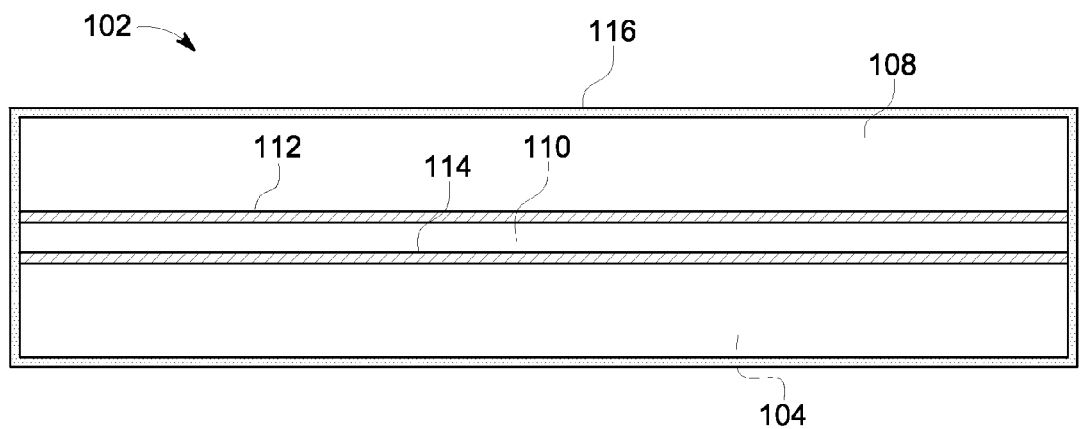
FIG. 3 is a cross sectional view of the first wafer after a first passivation layer has been deposited.

FIG. 3 is a cross sectional view of the first wafer 102 after a first passivation layer 116 has been deposited in step 502 (FIG. 18). The first passivation layer 116 is deposited on at least the first device layer 108 of the first wafer 102 and provides electrical insulation and protection during manufacturing. The first passivation layer 116 can be comprised of silicon dioxide, silicon nitride or a combination of both. The first passivation layer 116 may be applied by wet deposition or dry deposition techniques.

Figure 4:
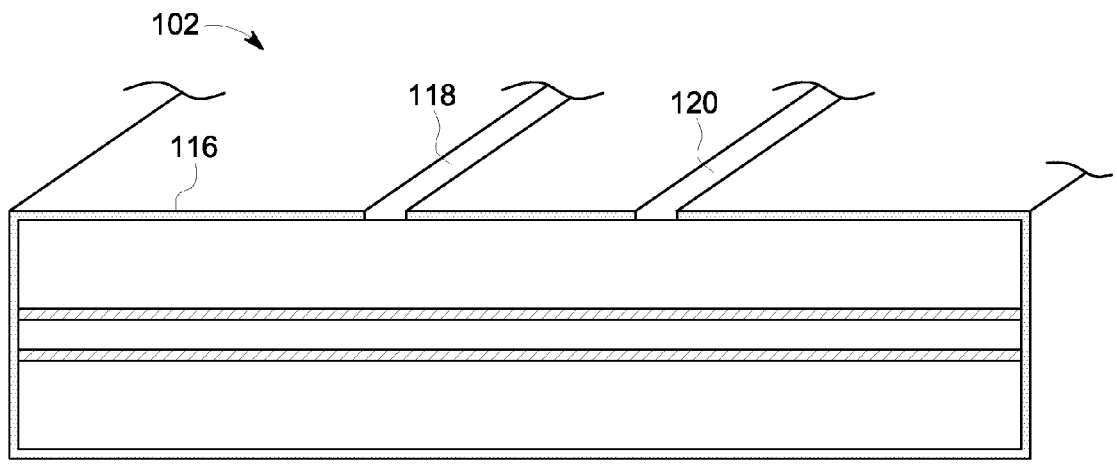
FIG. 4 is a perspective view of the first wafer illustrating the formation of first and second windows in the first passivation layer.
Figure 5:
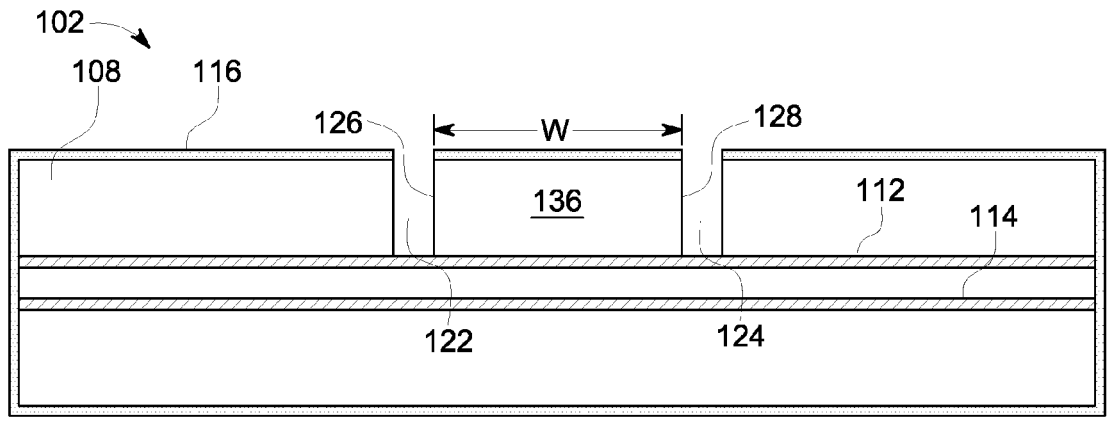
FIG. 5 is a cross sectional view of the first wafer showing first and second channels in a first device layer of the first wafer.

After the first passivation layer 116 has been deposited, as shown in FIGS. 4 and 5, the boss structure 136 is defined by forming channels in the first device layer 108 of the first wafer 102 in step 504 (FIG. 18). FIG. 4 is a perspective view of the first wafer 102 illustrating the formation of first and second windows 118, 120 in the first passivation layer 116. FIG. 5 is a cross sectional view of the first wafer 102 showing the first and second channels 122, 124 formed in the first device layer 108 of the first wafer 102.

As illustrated in FIGS. 4 and 5, these channels 122, 124 are formed by etching first and second windows 118, 120 in the first passivation layer 116 to expose portions of the first device layer 108. In one embodiment, the etching is performed using dry etching techniques. The width (W) of boss structure 136 is determined by the distance between first window 118 and second window 120. In one embodiment, the etching of the channels 122, 124 includes a two step process whereby relatively rapid etching conditions are followed by relatively slow etching conditions. For example, the majority of the etching may be performed using potassium hydroxide. Thereafter, TMAH is used to complete the etching. This permits the first and second channels 122, 124 to have a controlled shape and dimensions including substantially parallel inner vertical sidewalls 126, 128. For example, first inner vertical sidewall 126 of the first channel 122 is substantially parallel to the second inner vertical sidewall 128 of the second channel 124. The etching forms channels 122, 124 that extend from the top surface of the first device layer 108 to the first buried oxide layer 112.

Figure 6:
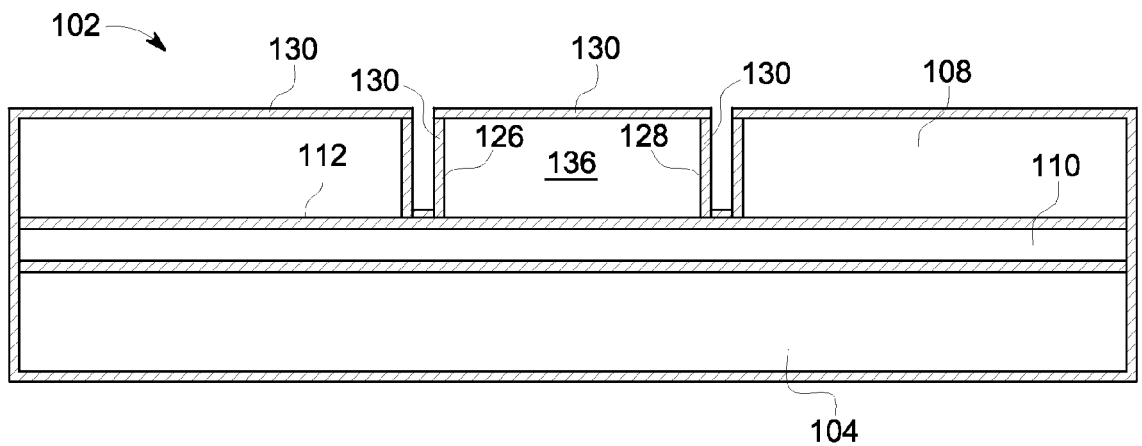
FIG. 6 is a cross sectional view of the first wafer after removal of the first passivation layer and the application of an oxide layer.

FIG. 6 is a cross sectional view of the first wafer 102 after removal of the first passivation layer 116 and the application of an oxide layer 130 on the external surface of the first wafer 102 in step 506 (FIG. 18). In one embodiment, the oxide layer 130 is about 1.0 micron thick. Oxide layer 130 is applied on the vertical sidewalls of the first and second channels 122, 124 including the inner vertical sidewalls 126, 128 that are adjacent to boss structure 136. For example, oxide layer 130 may be applied using coating techniques, deposition techniques, thermal growing techniques, and the like. The oxide layer 130 along the inner vertical sidewalls 126, 128 protects the boss structure 136 from subsequent etching. The inner vertical sidewalls 126, 128 of the first and second channels 122, 124 form the sidewalls of the boss structure 136.

Figure 7:
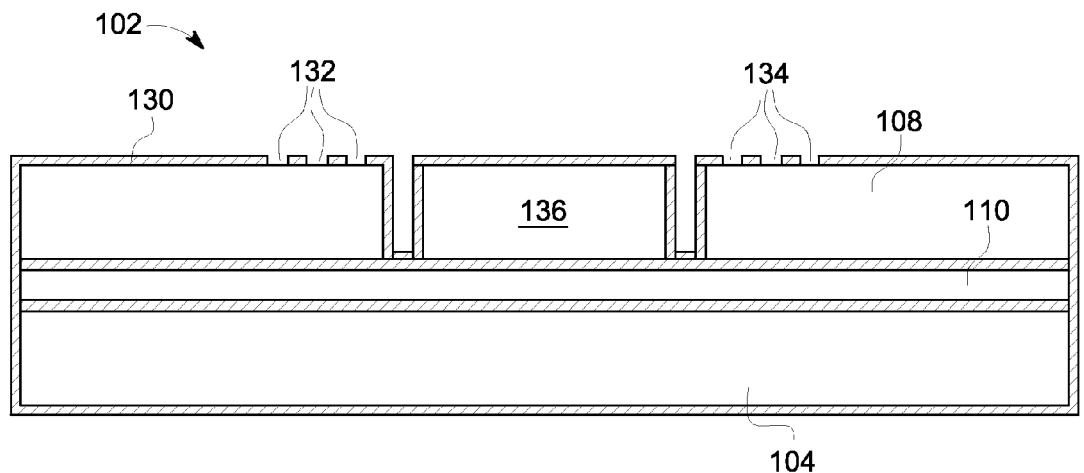
FIG. 7 is a cross sectional view of the first wafer showing the formation of first and second plurality of windows in the oxide layer.
Figure 8:
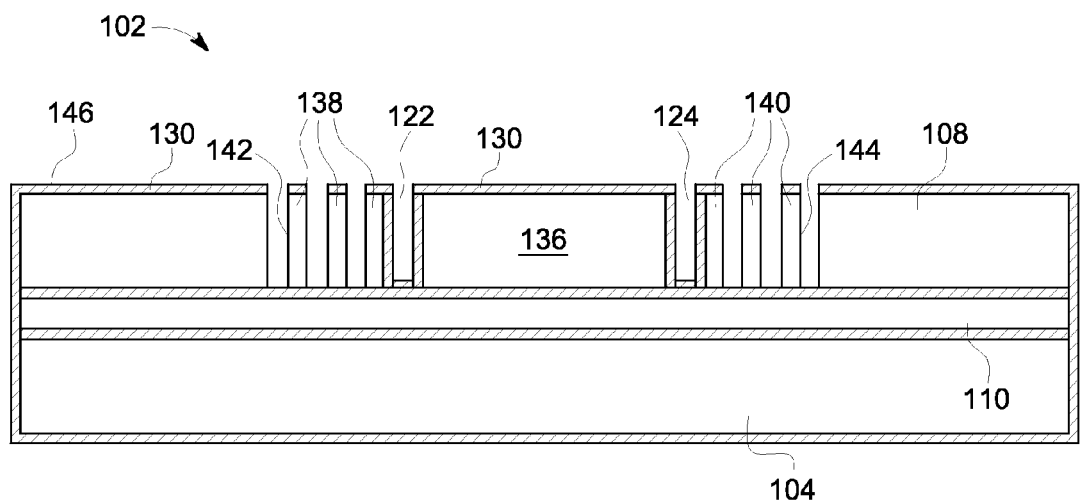
FIG. 8 is a cross sectional view of the first wafer showing the etching of sacrificial fins in the first device layer.

After oxide layer 130 has been applied, as shown in FIGS. 7 and 8, a plurality of sacrificial fins 138, 140 are etched in the first device layer 108 in step 508 (FIG. 18). These sacrificial fins 138, 140 will subsequently be removed to form a portion of the diaphragm cavity 326. FIG. 7 is a cross sectional view of the first wafer 102 showing the formation of a first and second plurality of windows 132, 134 in the oxide layer 130. Each window within the plurality of windows 132, 134 is positioned at relatively close intervals (for example, about 10 microns to 50 microns apart). As shown in FIG. 8, when channels are subsequently etched via first and second plurality of windows 132, 134, the resulting first plurality and second plurality of sacrificial fins 138, 140 are relatively thin. At least two sacrificial fins are formed which flank the boss structure 136 defined by first and second channels 122, 124. In some embodiments, more than two sacrificial fins are formed to facilitate removal of the sacrificial fins in subsequent steps by providing an increased surface area for etching. In the embodiment of FIG. 8, three sacrificial fins 138, 140 are formed on each side of diaphragm 330 for a total of six sacrificial fins 138, 140. Since the plurality of sacrificial fins 138, 140 are etched after the oxide layer 130 has been deposited, the vertical edges 142, 144 of the plurality of sacrificial fins 138, 140 are substantially oxide free. In contrast, the vertical sidewalls of first and second channels 122, 124, including the sidewalls 126, 128 of the boss structure 136 are coated with the oxide layer 130, thereby protecting boss structure 136. Since oxide layer 130 provides a degree of protection against etching, it is possible to selectively remove the first and second plurality of sacrificial fins 138, 140 without removing boss structure 136.

Figure 9:
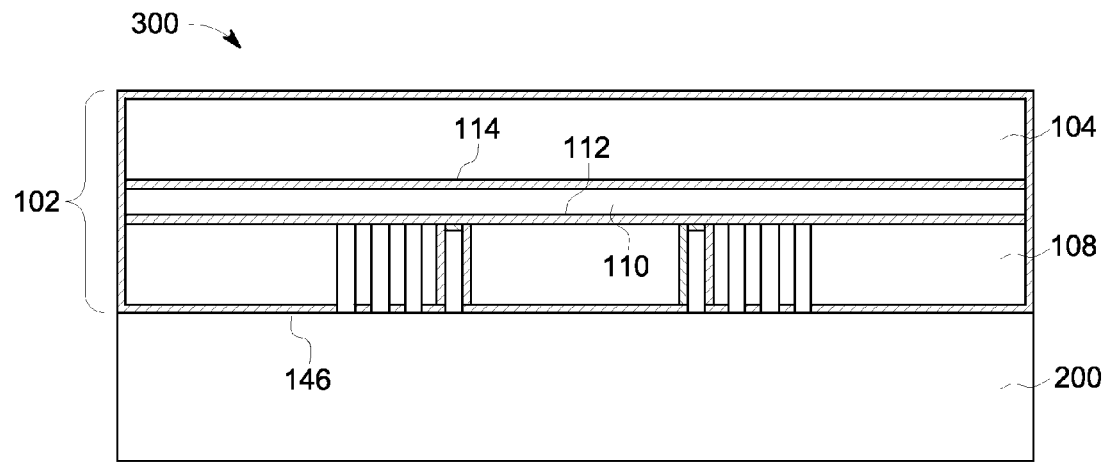
FIG. 9 is a cross sectional view of the bonding of the first wafer to a second wafer to form a wafer assembly.

FIG. 9 is a cross sectional view of the bonding of the first wafer 102 to a second wafer 200 to form a wafer assembly 300 in step 510 (FIG. 18). The first wafer 102 of FIG. 8 is shown inverted and its patterned surface 146 is bonded to the second wafer 200. In one embodiment, the second wafer 200 is a double sided polished wafer. The second wafer 200 may be a single crystal silicon wafer and may be n-type or p-type. Bonding between the second wafer 200 and the first wafer 102 may occur by silicon fusion bonding at elevated temperature (e.g., in the range of 900° C. to 1200° C.).

Figure 10:
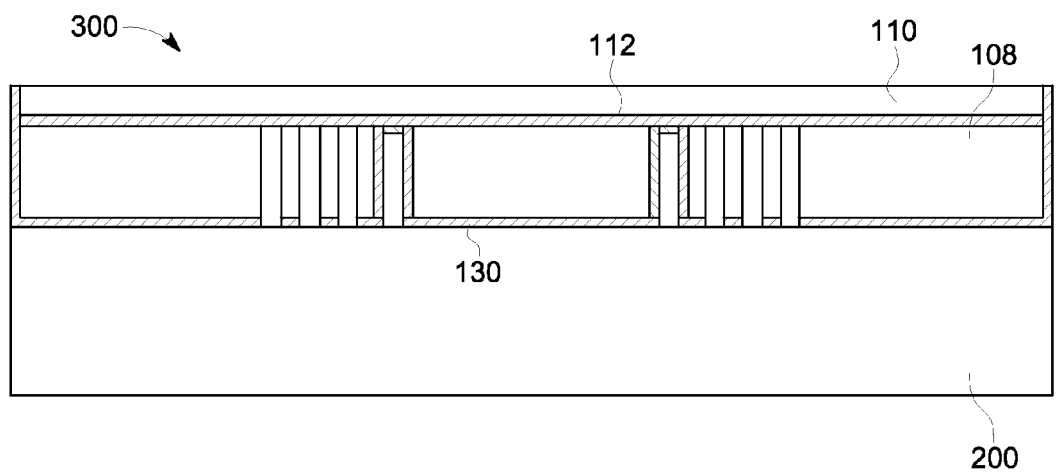
FIG. 10 is a cross sectional view of the wafer assembly after removal of a handling layer.

After bonding, as shown in FIG. 10, the handle layer 104 is removed by a suitable method in step 511 (FIG. 18). In one embodiment, the majority of the handle layer 104 is removed by grinding. Residual material is subsequently removed using etching techniques. After the handle layer 104 has been removed, the second buried oxide layer 114 is removed by wet or dry etching to provide wafer assembly 300 shown in FIG. 10.

Figure 11:
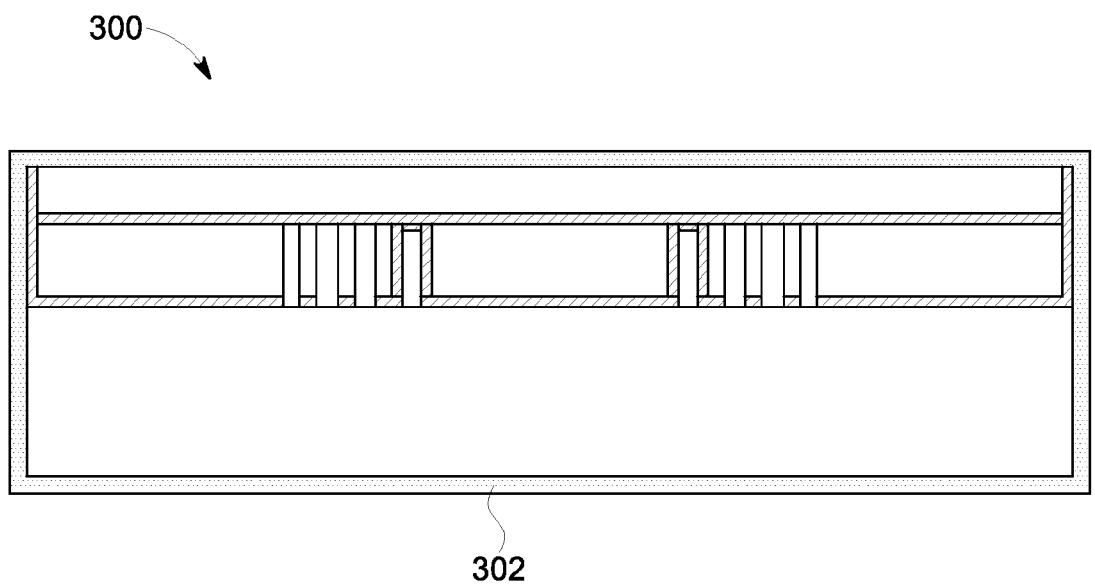
FIG. 11 is a cross sectional view of the wafer assembly after a second passivation layer has been deposited.

FIG. 11 is a cross sectional view of the wafer assembly 300 after a second passivation layer 302 has been deposited in step 512 (FIG. 18). In the exemplary embodiment of FIG. 11, a second passivation layer 302 is coated on all exposed surfaces of wafer assembly 300, including its upper and lower surfaces. The second passivation layer 302 can be comprised of silicon dioxide, silicon nitride or a combination of both. The second passivation layer 302 may be applied by wet deposition or dry deposition techniques.

Figure 12:
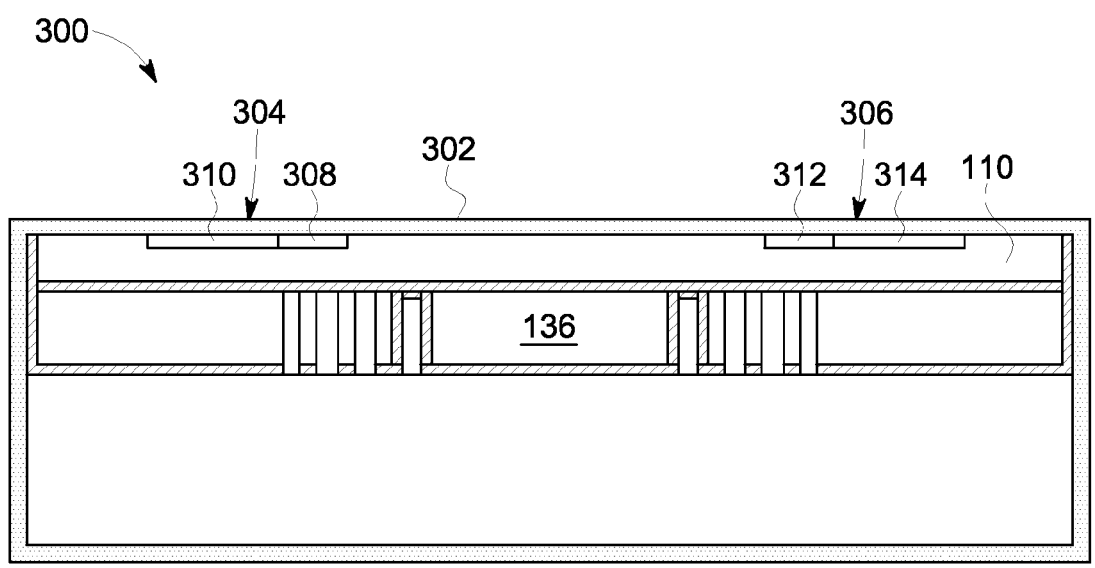
FIG. 12 is a cross sectional view of the wafer assembly showing the formation of first and second sensors into the second device layer.

Thereafter, as shown in FIG. 12, first and second sensors 304, 306 are formed by diffusing or ion implanting a dopant into the second device layer 110, through the second passivation layer 302 in step 514 (FIG. 18). The implanted dopant has a polarity opposite that of the second device layer 110. For example, if the second device layer 110 has n-type dopants, the first and second sensors 304, 306 are formed by implanting a p-type dopant. Interconnects 310, 314 and piezoresistors 308, 312 can be formed within the first and second sensors 304, 306 by controlling the concentration of the dopant. For example, a first piezoresistor 308 is formed within the first sensor 304 by implanting a low concentration of the dopant while the first interconnect 310 is formed by implanting a high concentration of the dopant. The second piezoresistor 312 and the second interconnect 314 are formed in an analogous manner. In the embodiment of FIG. 12, the first and second piezoresistors 308, 312 are proximal to the boss structure 136 while the first and second interconnects 310, 314 are distal to the boss structure 136. The first and second piezoresistors 308, 312 are between the boss structure 136 and the first and second interconnects 310, 314, respectively. In other embodiments, one or more additional sensors are provided in the second device layer 110. The additional sensors may be strategically positioned at various points on the diaphragm 330. For example, in one embodiment, a third sensor is provided in the second device layer 110 between the first sensor 304 and the first inner vertical sidewall 126. Likewise, a fourth sensor may be provided in the second device layer 110 between the second sensor 306 and the second inner vertical sidewall 128.

Figure 13:
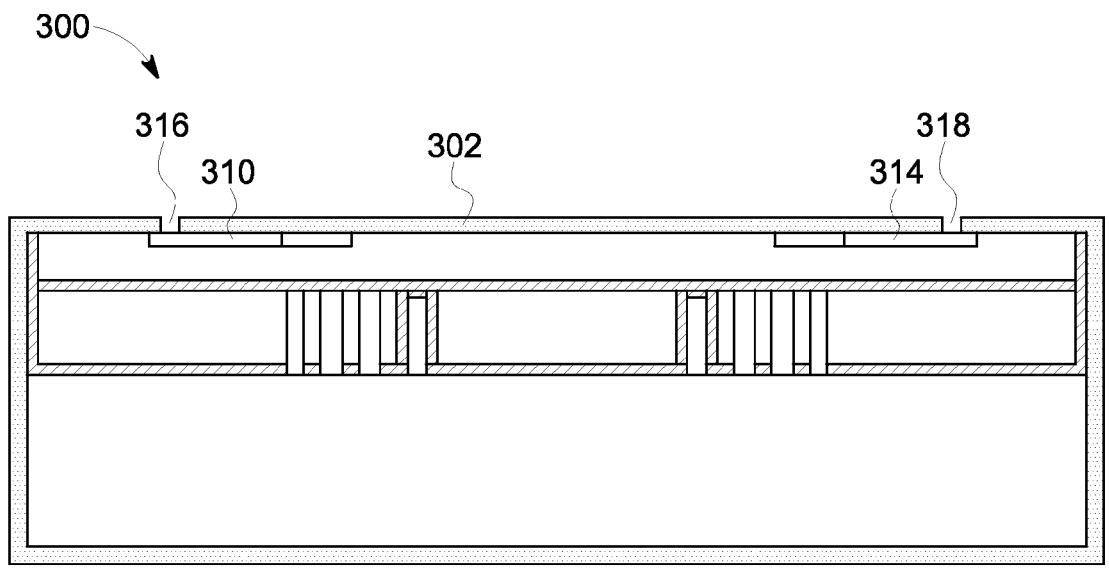
FIG. 13 is a cross sectional view of the wafer assembly depicting the formation of first and second windows in the second passivation layer, each connecting to the first and second sensors.
Figure 14:
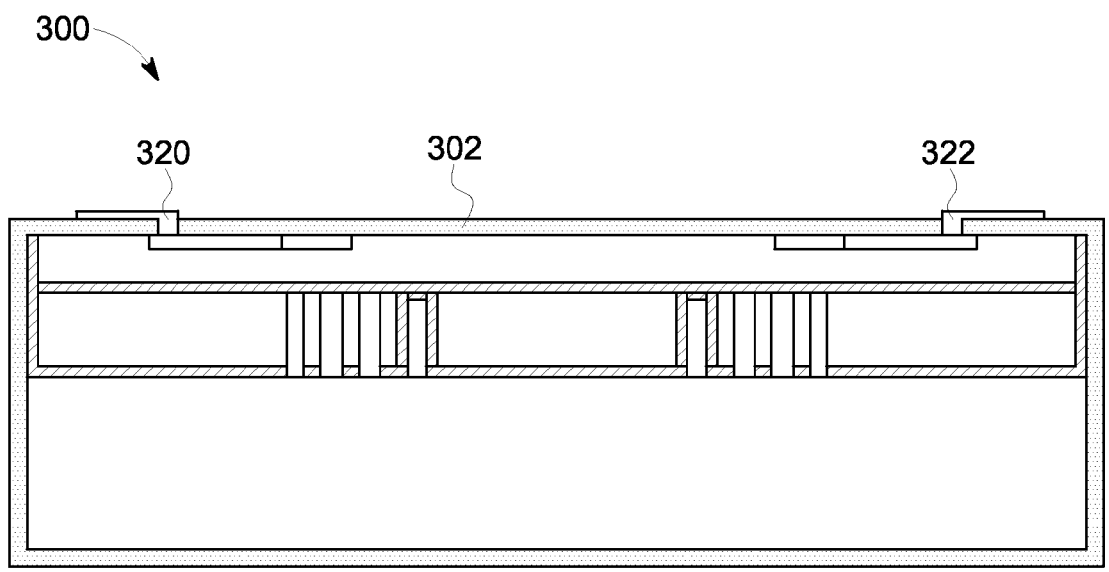
FIG. 14 is a cross sectional view of the wafer assembly illustrating the deposition of a metallization layer into the first and second windows.

After the first and second sensors 304, 306 are formed, as shown in FIGS. 13 and 14, first and second metallization layers 320, 322 are deposited on the sensors 304, 306 in step 515 (FIG. 18). In the embodiment of FIG. 13, first and second windows 316, 318 are formed over the first and second interconnects 310, 314. As shown in FIG. 14, first and second metallization layers 320, 322 are subsequently deposited on the second passivation layer 302 such that the first and second windows 316, 318 are filled, thereby providing an electrical connection between the first and second metallization layers 320, 322 and the first and second sensors 304, 306, respectively. The first and second metallization layers 320, 322 may be, for example, layers of gold or aluminum and may be of a desired thickness for subsequent processing and assembly steps.

Figure 15:
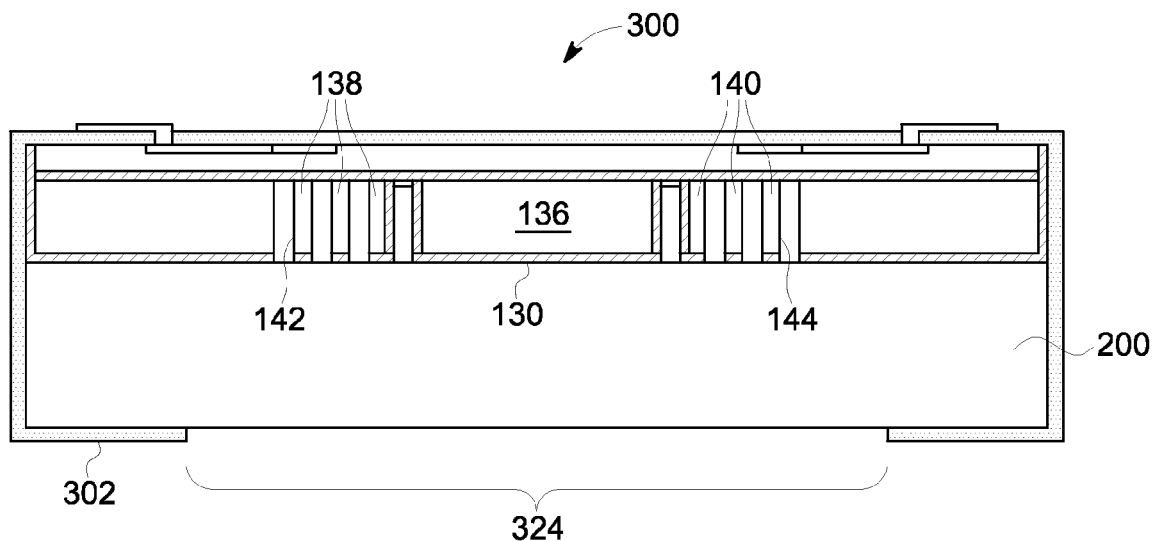
FIG. 15 is a cross sectional view of the wafer assembly depicting the formation of a third window in the second passivation layer.
Figure 16:
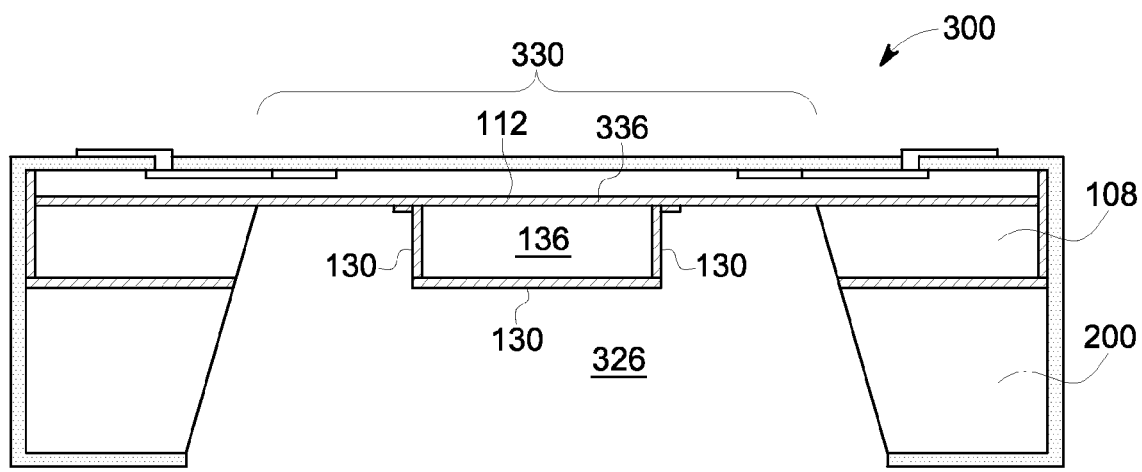
FIG. 16 is a cross sectional view of the wafer assembly after etching through both the second wafer and the first device layer.

As shown in FIGS. 15-16, the diaphragm cavity 326 is formed in step 516 (FIG. 18). As shown in FIG. 15, a third window 324 is etched in the lower surface of the second passivation layer 302 such that a portion of the lower surface of the second wafer 200 is exposed. As shown in FIG. 16, the diaphragm cavity 326 is then formed by etching through the third window 324 to the first buried oxide layer 112. During this etching process, the oxide layer 130 protects the boss structure 136 from etching. In contrast, the vertical edges 142, 144 of the first and second plurality of sacrificial fins 138, 140 are substantially oxide-free and are therefore etched. Since the first and second plurality of sacrificial fins 138, 140 are relatively thin (for example, 10 microns to 50 microns), the etching step removes the plurality of sacrificial fins 138, 140 and forms the diaphragm cavity 326.

Figure 17:
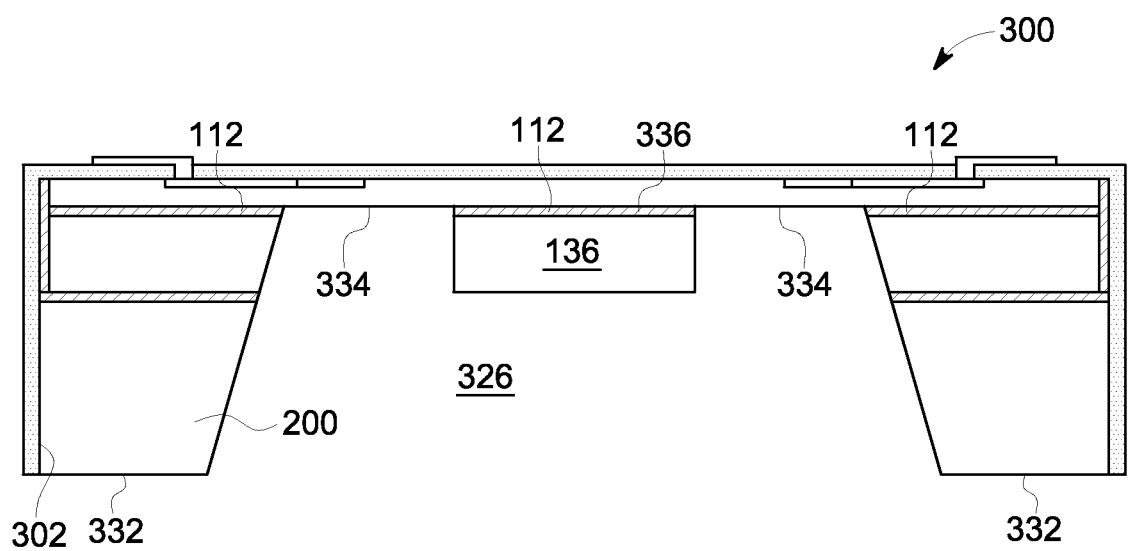
FIG. 17 is a cross sectional view of the wafer assembly showing a boss structure after removal of the oxide layer.
Figure 18:
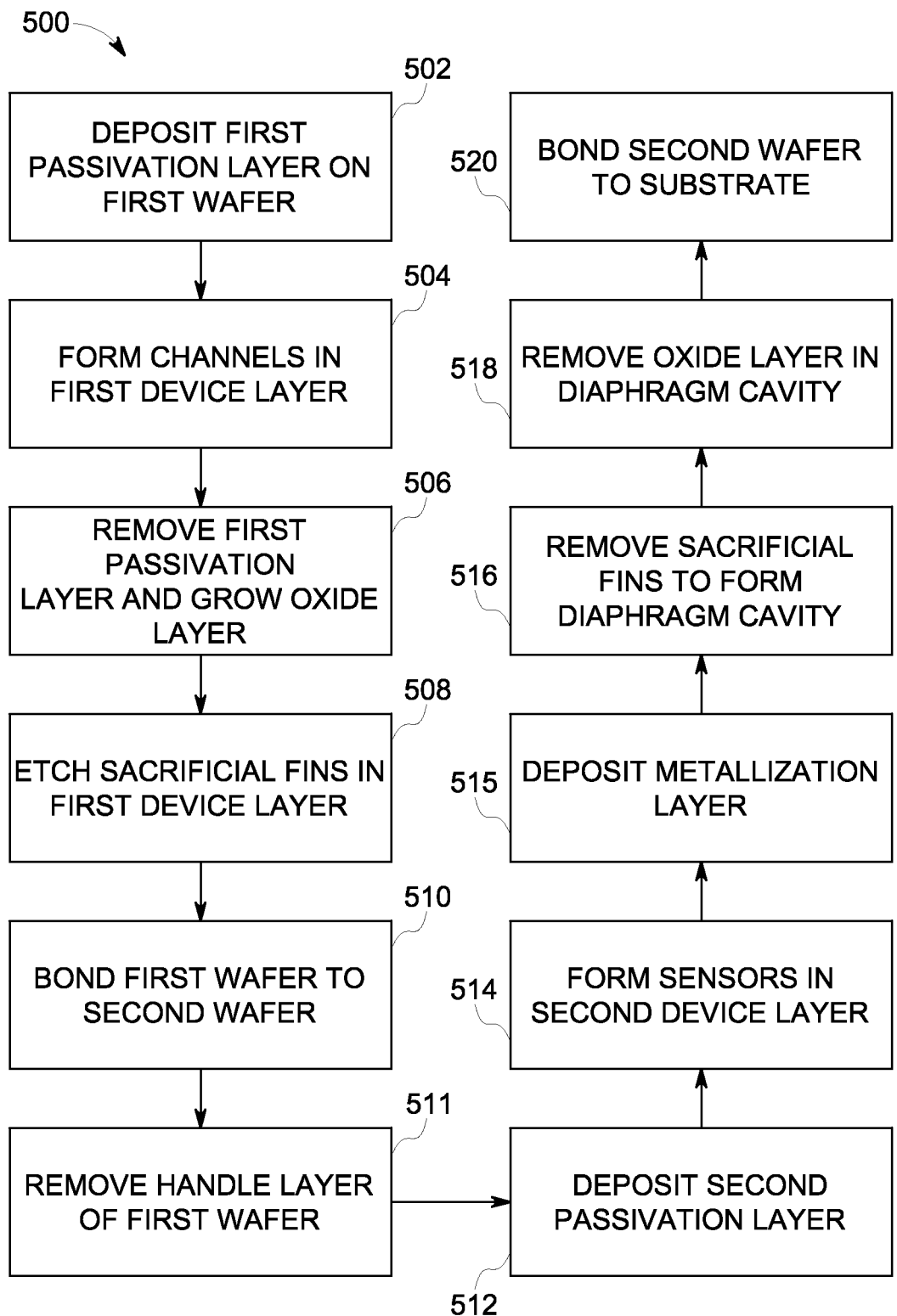
FIG. 18 is a process flow showing the steps of manufacturing an exemplary device for measuring forces.

Referring to FIG. 17, the oxide layer 130 is removed from the boss structure 136 by etching in step 518 (FIG. 18). The portions of the first buried oxide layer 112 that flank boss structure 136 are also removed to reveal exposed portions 334 of the second device layer 110, which are exposed to the diaphragm cavity 326. The lower surface 332 of the second wafer 200 is exposed by etching the lower edge of the second passivation layer 302. As shown in FIG. 1, the exposed lower surface 332 of the second wafer 200 may then be bonded to a supporting substrate, such as substrate 400 (FIG. 1) in step 520 (FIG. 18). Substrate 400 may be, for example, a glass or silicon substrate. In the embodiment of FIG. 1, the substrate 400 includes a preformed hole 402 which connects the diaphragm cavity 326 to the environment. The substrate 400 may be bonded to the exposed lower surface 332 at elevated temperature (e.g. 300° C. to 450° C. at 100V-3000V). In one embodiment, the substrate 400 is between about 500 microns and 1000 microns thick. In certain embodiments, a bonding material is used to bond the second wafer 200 to the substrate 400. Examples of bonding materials include glass fits, Au—Si eutectic solders and similar metal alloys.

In the embodiment of FIG. 1, the preformed hole 402 includes a counter bore 404 adjacent diaphragm cavity 326. Depending on the height of the second wafer 200, it may be advantageous to provide the counter bore 404 with a width that is wider than the width (W) of the boss structure 136 and wider than the width of the preformed hole 402. In such an embodiment the boss structure 136 provides a contoured area that can receive the boss structure 136 when the diaphragm 330 is defected downward. In those embodiments where the second wafer 200 is thick, counter bore 404 may be omitted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A device for measuring forces, the device comprising:
   a first wafer comprising a first buried oxide layer disposed between a first device layer and a second device layer;
   a second wafer joined to the first device layer by a second buried oxide layer;
   a diaphragm cavity extending from the second device layer, through the first device layer, the second buried oxide layer, and the second wafer, wherein the second device layer forms a diaphragm over the diaphragm cavity;
   a boss structure within the diaphragm cavity, the boss structure extending from the first buried oxide layer, the boss structure having substantially parallel sidewalls; and
   a first sensor in the second device layer proximate to the diaphragm to sense flexure in the diaphragm.

2. The device of claim 1, wherein the boss structure having substantially uniform thickness over its width.

3. The device of claim 1, wherein the first sensor comprises a piezoresistor.

4. The device of claim 1, further comprising a second sensor in the second device layer proximate to the diaphragm, the first and second sensors flanking the boss structure.

5. The device of claim 4, further comprising a first and second metallization layer disposed on the first and second sensors, respectively.

6. The device of claim 1, further comprising a substrate bonded to the second wafer.

7. The device of claim 6, wherein the substrate comprises a preformed hole that connects the diaphragm cavity to an environment surrounding the device.

8. The device of claim 1, wherein the second device layer has first and second exposed portions that are exposed to the diaphragm cavity, the first and second exposed portions flanking the boss structure.

9. The device of claim 8, wherein the second buried oxide layer comprises a portion that is contiguous with both the boss structure and the second device layer and disposed between first and second exposed portions of the second device layer.

10. A device for measuring forces, the device comprising:
a first wafer comprising a first buried oxide layer disposed between a first device layer and a second device layer;
a second wafer joined to the first device layer by a second buried oxide layer;
a diaphragm cavity extending from the second device layer, through the first device layer, the second buried oxide layer, and the second wafer, wherein the second device layer forms a diaphragm over the diaphragm cavity;
a boss structure within the diaphragm cavity, the boss structure extending from the first buried oxide layer, the boss structure having substantially parallel sidewalls and substantially uniform thickness over its width; and
a first sensor in the second device layer proximate to the diaphragm to sense flexure in the diaphragm.

11. The device of claim 1, wherein said boss is configured to tune sensitivity of the diaphragm.

12. The device of claim 1, wherein said boss changes the flexure of the diaphragm.

13. The device of claim 1, wherein said boss is aligned with the diaphragm.

* * * * *